US007881261B2

(12) United States Patent
Julka et al.

(10) Patent No.: US 7,881,261 B2
(45) Date of Patent: Feb. 1, 2011

(54) METHOD AND APPARATUS FOR EFFICIENT DORMANT HANDOFF OF MOBILE STATIONS HAVING MULTIPLE PACKET DATA SERVICE INSTANCES

(75) Inventors: Vibhor Julka, San Diego, CA (US); Sanjeevan Sivalingham, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2011 days.

(21) Appl. No.: 10/672,233

(22) Filed: Sep. 25, 2003

(65) Prior Publication Data

US 2004/0063431 A1 Apr. 1, 2004

Related U.S. Application Data

(60) Provisional application No. 60/413,825, filed on Sep. 26, 2002.

(51) Int. Cl.
*H04Q 7/00* (2006.01)

(52) U.S. Cl. ............... 370/331; 370/332; 370/320; 370/335; 370/355; 370/356; 455/436; 455/440; 455/442; 455/443

(58) Field of Classification Search ................ 370/331, 370/335, 342, 332, 320; 455/436, 432, 440, 455/442, 443
See application file for complete search history.

(56) References Cited

U.S. PATENT DOCUMENTS 6,026,086 A * 2/2000 Lancelot et al. ............. 370/353

| | | | |
|---|---|---|---|
| 6,909,899 B2 * | 6/2005 | Wang et al. | 455/436 |
| 2002/0055364 A1 * | 5/2002 | Wang et al. | 455/466 |
| 2002/0057658 A1 * | 5/2002 | Lim | 370/331 |
| 2003/0054822 A1 * | 3/2003 | Core et al. | 455/436 |
| 2003/0063584 A1 * | 4/2003 | Sayeedi | 370/331 |
| 2004/0203780 A1 * | 10/2004 | Julka et al. | 455/436 |

FOREIGN PATENT DOCUMENTS

| WO | WO 0150783 | 7/2001 |
|---|---|---|
| WO | WO 0167786 | 9/2001 |

* cited by examiner

*Primary Examiner*—Vincent P Harper
*Assistant Examiner*—Fred A Casca
(74) *Attorney, Agent, or Firm*—Coats & Bennett, P.L.L.C.

(57) ABSTRACT

An exemplary method and apparatus provide improved dormant handoff of mobile stations having multiple packet data service instances. Each time a dormant IS-2000 mobile station undergoes a packet data mobility event it sends a dormant handoff request to the supporting network for each packet data service instance associated with it. If the mobile station does not have a traffic channel already assigned to it, each dormant handoff request are sent over common access channels. By recognizing that a given mobile station is re-registering multiple service instances for the same mobility event, the network can avoid excess common channel signaling by assigning a traffic channel to the mobile station responsive to receiving the dormant handoff request for its first service instance. Such an assignment causes the mobile station to send dormant handoff requests for any remaining service instances over the assigned traffic channel rather than over the common access channel.

43 Claims, 4 Drawing Sheets

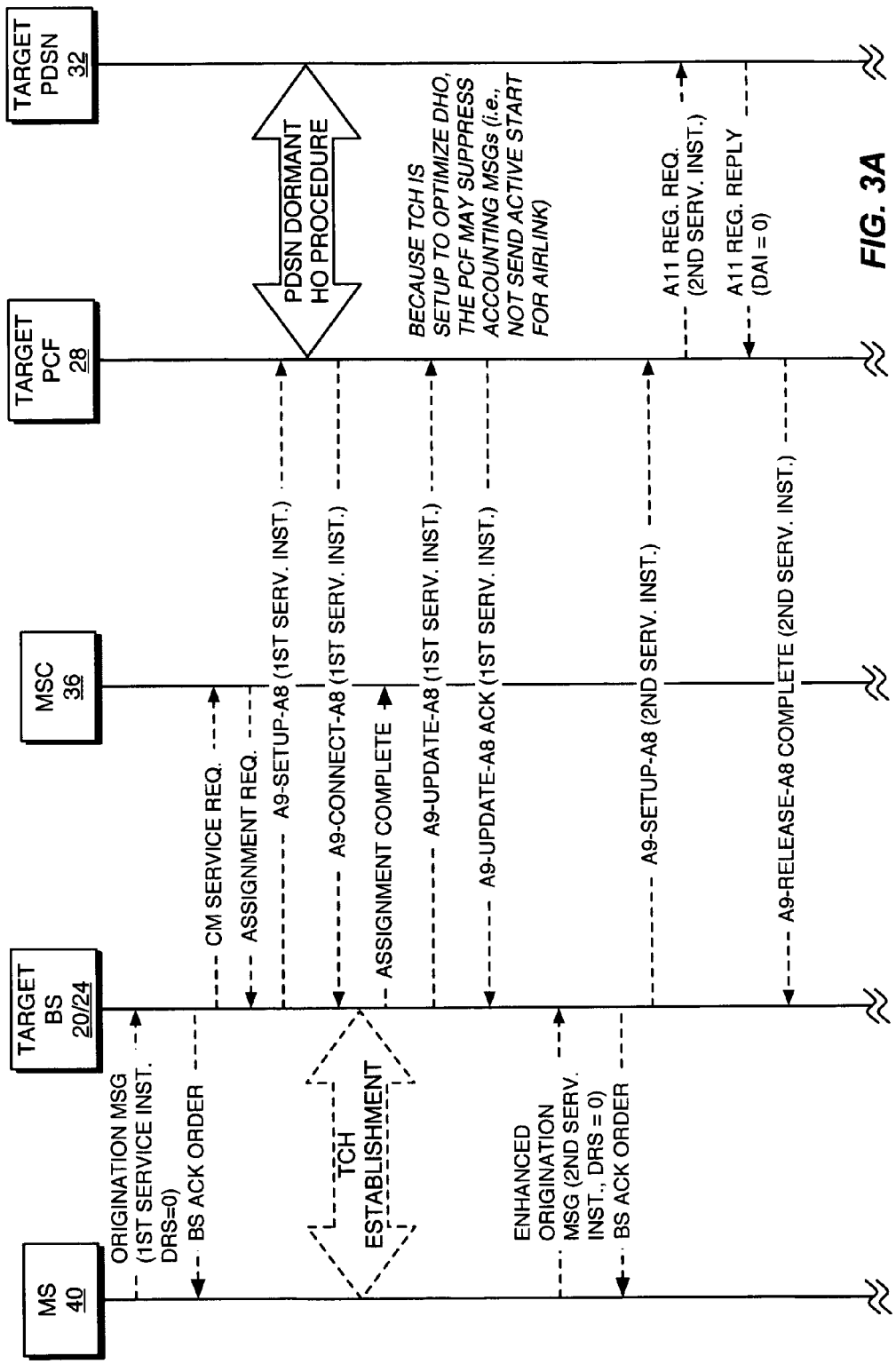

METHOD AND APPARATUS FOR EFFICIENT DORMANT HANDOFF OF MOBILE STATIONS HAVING MULTIPLE PACKET DATA SERVICE INSTANCES

RELATED APPLICATIONS

This application claims priority under 35 U.S.C. §119(e) from the following U.S. provisional application: Application Ser. No. 60/413,825 filed on Sep. 26, 2002. That application is incorporated in its entirety by reference herein.

BACKGROUND OF THE INVENTION

The present invention generally relates to wireless communication networks, and particularly relates to dormant handoff of mobile stations having multiple packet data service instances.

In a cdma2000 network, Packet Data Serving Nodes (PDSNs) establish, maintain, and terminate Point-to-Point Protocol (PPP) sessions for mobile stations supported by the network. In this role, PDSNs carry packet data between one or more Public Data Networks (PDNs), e.g., the Internet, and the mobile stations. Each PDSN routes packet data for mobile stations supported by a particular group of Base Stations (BSs). Entities referred to as Packet Control Functions (PCFs) provide the Radio-Packet (RP) interface between the BSs and the PDSN.

PCFs provide a number of functions supporting the RP interface, including managing the packet data states (active, dormant) of mobile stations, relaying packets between the mobile stations and the PDSNs, buffering data received from PDSNs for dormant mobile stations, supporting handovers, and PDSN selection. In some architectures, each BS, including a Base Station Controller (BSC), includes integrated PCF logic so that, effectively, each BS interfaces to an associated PDSN through its own PCF. In other architectures, each PCF interfaces a number of BSCs to one or more PDSNs. In either case, the radio service area or "footprint" associated with each PCF defines a packet zone that is identified uniquely in the network by the combination of a System ID (SID), a Network ID (NID), and a Packet Zone ID (PZID).

To properly route packet data, a given PDSN must know the current location of each mobile station that has a packet data session established with it, which, from the perspective of the PDSN, is tantamount to keeping track of the mobile station's serving PCF. A packet data session is the set of one or more packet data service instances in use at the RAN/PDSN for the mobile station. Therefore, as part of mobility management operations, cdma2000 networks require mobile stations to re-register with supporting PDSNs as the mobile stations move across packet zone boundaries. BSs broadcast SID/NID/PZID information on their overhead channels to keep mobile stations appraised of the SID/NID/PZID values for each service area. Mobile stations that are not active (on a traffic channel) detect their changing service locations by monitoring these overhead channels. In cdma2000 networks, such end-to-end packet data support is defined by several relevant standards in the cdma2000 family of standards (e.g., IS-707, IS-2000, IS-2001, and IS-835).

The first time a mobile station connects to a PDSN, a PPP session is established between the PDSN and the PCF as part of packet data call setup. Once a PPP session has been established for the mobile station, it remains connected to the network and subsequent transmissions between the PDSN and the mobile station can be initiated by the PDSN or by the mobile station over the PPP connection. However, despite the PPP connection being "on," the network tears down certain resources associated with that connection if no packet data is sent to or received from the mobile station for longer than a certain period of time. For example, the network tears down packet data radio links to the mobile station and tears down packet data traffic connections between the BS and PCF associated with the mobile station after the mobile station's packet data connection has been inactive for some period of time. A mobile station is considered "dormant" from the packet data perspective when all packet data service instances associated with it are dormant.

However, to keep the network apprised of movement affecting packet data routing, dormant mobile stations still must re-register with their supporting PDSNs as they move between different packet zones. This re-registration process is referred to as dormant (packet data) handoff and all mobile stations having dormant packet data sessions with the network perform dormant handoff responsive to recognizing movement between packet zones. Note that a mobile station can remain dormant from the packet data perspective even if it is engaged in an active voice call, i.e., whether a mobile station has radio links and a dedicated traffic channel allocated to it for circuit-switched voice service is immaterial to its packet data dormant status.

While the mobile station having or not having a voice traffic channel allocated to it does not affect its dormancy status, the presence or absence of that traffic channel does affect the mechanics of dormant handoff. If a dormant mobile station does not have a dedicated traffic channel allocated to it, it performs dormant handoff by transmitting an Origination message to a supporting BS using a common access channel available for use by all mobile stations in that service area. Receipt of the Origination message initiates some inter-entity signaling between the BS and an associated Mobile Switching Center (MSC) and between the BS/PCF/PDSN chain of network entities as part of packet data re-registration. If the mobile station has a dedicated traffic channel, it re-registers by transmitting an Enhanced Origination message (EOM) over the existing traffic channel, thereby avoiding use of the common access channel.

As a point of interest regarding re-registration, it should be noted that IS-2000 standards permit an individual mobile station to have multiple (up to six) packet data "service instances" per data session. The use of multiple service instances permits different data treatment for different packet data streams, e.g., it permits different Qualities of Service (QoS) for different types of packet data flowing between the network and a given mobile station. In some sense, this is tantamount to each mobile station having up to six packet data connections to the network (although all service instances share the same PPP connection). Indeed, each active packet data service instance for a given mobile station is assigned its own A8 and A10 traffic connections between the BSC and PCF, and between the PCF and the PDSN, respectively.

Current and past generation IS-2000 mobile stations treat each service instance like a separate data session inasmuch as these mobile stations perform dormant handoff re-registration for each service instance allocated to them. Thus, a mobile station having six service instances performs six dormant handoffs, one for each service instance, each time it crosses packet zone boundaries. If the mobile station does not have a dedicated traffic channel allocated to it when dormant handoff occurs, it sends an Origination message on the common access channel for each service instance, and all of the attendant BS/MSC signaling is repeated for each one of the received Origination messages. In this sense, then, a dormant mobile station with multiple service instances burdens the network to the same extent as a like multiple of individual mobile stations each having one service instance.

SUMMARY OF THE INVENTION

The present invention comprises a method and apparatus to improve dormant (packet data) handoff of mobile stations by assigning a traffic channel to a mobile station undergoing a dormant handoff of multiple packet data service instances. According to an exemplary embodiment of the present invention, a method of managing dormant handoffs of mobile stations at a wireless communication network BS comprises initiating dormant handoff of a mobile station that is undergoing a packet data mobility event responsive to receiving a first dormant handoff request from the mobile station for a first packet data service instance of the mobile station, recognizing that the mobile station has additional packet data service instances requiring dormant handoff, and selectively assigning a traffic channel to the mobile station to cause it to send additional dormant handoff requests for the additional packet data service instances over the assigned traffic channel.

In an exemplary embodiment, the PDSN supporting the mobile station's packet data service instances receives an A11-Registration Request from the PCF as part of dormant handoff procedures for the mobile station's first packet data service instance. In response, the PDSN examines the packet data session information for the mobile station, determines that it has multiple packet data service instances, and returns a Multiple Service Instance (MSI) count in the A11-Registration Reply message it returns. The PCF receives the MSI count and passes it along to the BS, which can then make the determination as to whether or not a traffic channel should be assigned to the mobile station to improve the efficiency of handing off its remaining dormant service instances. Inclusion of a MSI count in the message received at the BS serves as an indication of multiple service instances.

Thus, where a mobile station having multiple packet data services undergoes a packet data mobility event, i.e., it crosses packet zone boundaries, receipt of the first dormant handoff request from that mobile station at the supporting BS results in the mobile station being assigned a dedicated traffic channel to the mobile station such that the mobile station sends additional dormant handoff requests as EOMs over the newly assigned traffic channel. That prevents the additional dormant handoff requests from the mobile station for the same mobility event from being sent over the common access channel, which relieves the overall loading on that channel and prevents redundant signaling to the MSC.

An exemplary BS includes a BSC that comprises a first interface to communicate with one or more Radio Base Stations (RBSs) that support wireless communication with a plurality of mobile stations, a second interface circuit to communicate with a Packet Control Function (PCF) that provides a Radio-Packet (RP) interface between the BSC and a PDSN in a Packet Switched Core Network (PSCN), and a control circuit to control dormant handoff of mobile stations. An exemplary control circuit is configured to initiate dormant handoff of a mobile station that is undergoing a packet data mobility event responsive to receiving a first dormant handoff request from the mobile station for a first packet data service instance of the mobile station, recognize that the mobile station has additional packet data service instances requiring additional dormant handoffs, and selectively assign a traffic channel to the mobile station to cause the mobile station to send any additional dormant handoff requests for the additional packet data service instances over the assigned traffic channel rather than over a common access channel.

For example, upon receipt of the A9-Connect-A8 message returned from the PCF for the first service instance of a mobile station undergoing dormant handoff, the BSC can determine whether it should setup a traffic channel for handoff of the mobile station's remaining service instances based on, for example, the number of service instances associated with the mobile station, and on resource loading at the BSC. If a traffic channel is established then the BSC can use the service instance count information to determine when all the service instances have undergone dormant handoff and release the radio resources and clear the A8 connection. Additionally, since the purpose of the radio resource allocation is to optimize network performance (reduce Access Channel loading and MSC/BSC signaling), it is unreasonable to charge the subscriber for allocation of the traffic channel. Hence, the PCF may choose to suppress its transmission of accounting records to the PDSN to avoid charging the subscriber when radio resources are allocated in support of improved dormant handoff. In particular, the PCF, upon receipt of the A9-Update-A8 message associated with assignment of the traffic channel, does not send the Active Start Airlink record to the PDSN unless user data transfer is detected to or from the mobile station on the A8/A10 connection.

Complementing the exemplary BSC, a PCF can be configured to support dormant handoffs of mobile stations according to an exemplary method comprising recognizing that a mobile station undergoing dormant handoff has multiple packet data service instances, and sending an indication of the multiple packet data service instances to a Base Station (BS) supporting the dormant handoff of the mobile station. Such recognition can be based on recognizing a multiple services indicator in a registration reply returned to the PCF by the supporting PDSN as part of re-registering the mobile station's first packet data service instance.

As just noted, the PCF also can be configured to suppress the accounting message, e.g., "Airlink Active," that normally is sent to the PDSN in association with making a traffic channel assignment for packet data service. In other words, because the BSC makes the traffic channel assignment to improve dormant packet data handoff rather than to carry packet data to or from the mobile station, the PCF can be configured to suppress any associated accounting messages normally used to track packet data air time charges against the mobile station.

While determination of whether a given mobile station has multiple packet data service instances associated with it can be made in the BSC or the PCF, in an exemplary embodiment the PDSN is configured to make that determination as part of processing registration requests. Thus, where the PDSN receives a registration request message from a PCF as part of re-registering a first packet data service instance of a mobile station undergoing dormant handoff, it can be configured to determine whether that mobile station is associated with multiple packet data service instances. An indication of that condition can be returned by the PDSN to the PCF as part of the registration reply message. In an exemplary embodiment, the PDSN includes a count indication in the registration reply returned for the first packet data service instance being re-registered for a mobile station undergoing dormant handoff. That is, the PDSN returns a count or other value relating to the number of packet data service instances associated with the mobile station being handed off.

In an exemplary embodiment, the present invention is embodied in a cdma2000 wireless communication network and thus provides improved dormant handoff for mobile stations having dormant packet data sessions established with the network. The following detailed discussion and accompanying figures illustrate exemplary operations that focus particularly on cdma2000 implementations of the present invention, but it should be understood that the present invention could be applied to wireless communication networks based on other communication standards.

BRIEF DESCRIPTION OF THE DRAWINGS

FIGS. 3A and 3B are diagrams of exemplary inter-entity signaling associated with handing off multiple packet data service instances.

DETAILED DESCRIPTION OF THE INVENTION

Figure 1:
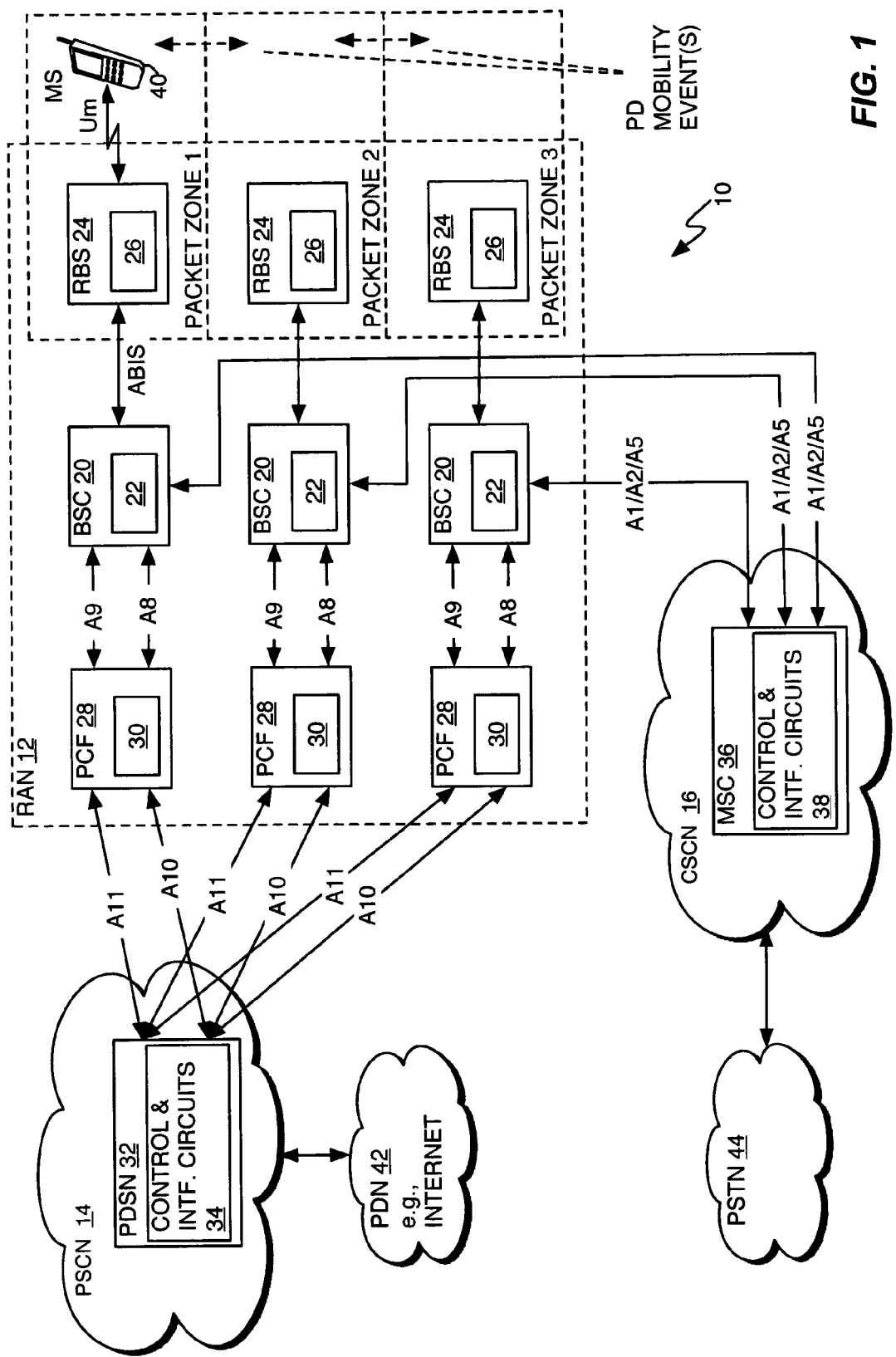
FIG. 1 is a diagram of a wireless communication network according to an exemplary embodiment of the present invention.

FIG. 1 is a diagram of an exemplary wireless communication network 10. In an exemplary embodiment of the present invention, network 10 comprises a cdma2000 network configured according to the IS-2000/IS-2001 family of standards. Network 10 comprises a Radio Access Network (RAN) 12, a Packet-Switched Core Network (PSCN) 14, and a Circuit-Switched Core Network (CSCN) 16.

RAN 12 comprises Base Station Controllers (BSCs) 20, each including control and interface circuits 22, Radio Base Stations (RBSs) 24, each including control and interface circuits 26, and Packet Control Functions (PCFs) 28, each including control and interface circuits 30. PSCN 14 comprises one or more Packet Data Serving Nodes (PDSNs) 32, each including control and interface circuits 34, and CSCN 16 comprises one or more Mobile Switching Centers (MSCs) 36, each including control and interface circuits 38.

In an exemplary embodiment of network 10, the inter-entity interfaces are implemented according to the IS-2001 Inter-Operability standards. Thus, the PCF-BSC interface circuits comprise A9 signaling and A8 user traffic interface circuits, and the PCF-PDSN interface circuits comprise A11 signaling and A10 user traffic interface circuits. Similarly, each BSC 20 interfaces to an MSC 36 via the standardized A1/A2/A5 interfaces. The A1 interface provides signaling between call control and mobility management functions in MSCs 36 and call control components in BSCs 20. Of course, the various entities can include additional standard or proprietary interfaces that are not shown.

In operation, RAN 12 communicatively couples mobile stations 40 to one or more packet-switched Public Data Networks (PDNs) 42, such as the Internet, and to one or more circuit-switched networks 44, such as the Public Switched Telephone Network (PSTN). It should be understood that the present invention focuses on dormant handoff of packet data services and that details of the circuit-switched side of network 10 are not necessary for understanding the exemplary handoff management methods described herein. Indeed, the present invention can be practiced in networks that do not offer circuit-switched services in conjunction with packet-switched data services.

Thus, turning to packet-switched service details, network 10 provides packet data services over a number of "packet zones," e.g., Packet Zone 1, Packet Zone 2, etc., wherein each packet zone corresponds to the "footprint" or service area of one PCF 28. In an exemplary embodiment, each BSC 20 and its set of one or more associated RBSs 24 form a Base Station (BS), sometimes referred to as a Base Station System (BSS), that provides radio coverage over a given geographic area or areas. Where each PCF 28 is integrated with, or otherwise associated with, a single BSC 20, the footprint of each PCF 28 corresponds to the radio coverage area(s) of its associated BSC 20. Those skilled in the art should appreciate that other arrangements are possible and that the actual arrangement of PCFs 28 and corresponding packet zones is a matter of design choice.

Once a particular mobile station 40 establishes a data session with network 10, its movements with respect to packet zones must be tracked to ensure proper data routing between it and network 10. More particularly, each packet data service instance established for the mobile station 40 must be registered (or re-registered) with a supporting PDSN 32 so that packet data traffic can be properly routed between the PDSN 32 and the mobile station 40. As noted earlier herein, each mobile station 40 can be associated with multiple packet data service instances and, according to current cdma2000 standards, each of those packet data service instances must be re-registered each time the mobile station 40 crosses a packet zone boundary.

The present invention improves management of such re-registrations in the context of dormant handoffs when no traffic channel exists, wherein a mobile station 40 having multiple packet data service instances, all of them in a dormant state, undergoes a packet data mobility event, i.e., it crosses a packet zone boundary. In this context, the present invention provides numerous handoff management improvements, including reducing the burden on the network's common access channels and reducing inter-entity signaling in association with carrying out dormant handoff. For dormant handoff processing in situations where the mobile station 40 already has a traffic channel assigned to it (e.g., voice call), all dormant handoff requests are received as EOMs and are processed according to existing IS-2000 standards.

As noted earlier herein, if mobile station 40 is configured according to IS-2000 standards, it sends dormant handoff requests over a common access channel if it does not have any traffic channel assigned to it. If it has a currently assigned traffic channel, it sends dormant handoff requests over the traffic channel rather than over the common access channel. The present invention exploits this behavior to improve dormant handoff.

Figure 2:
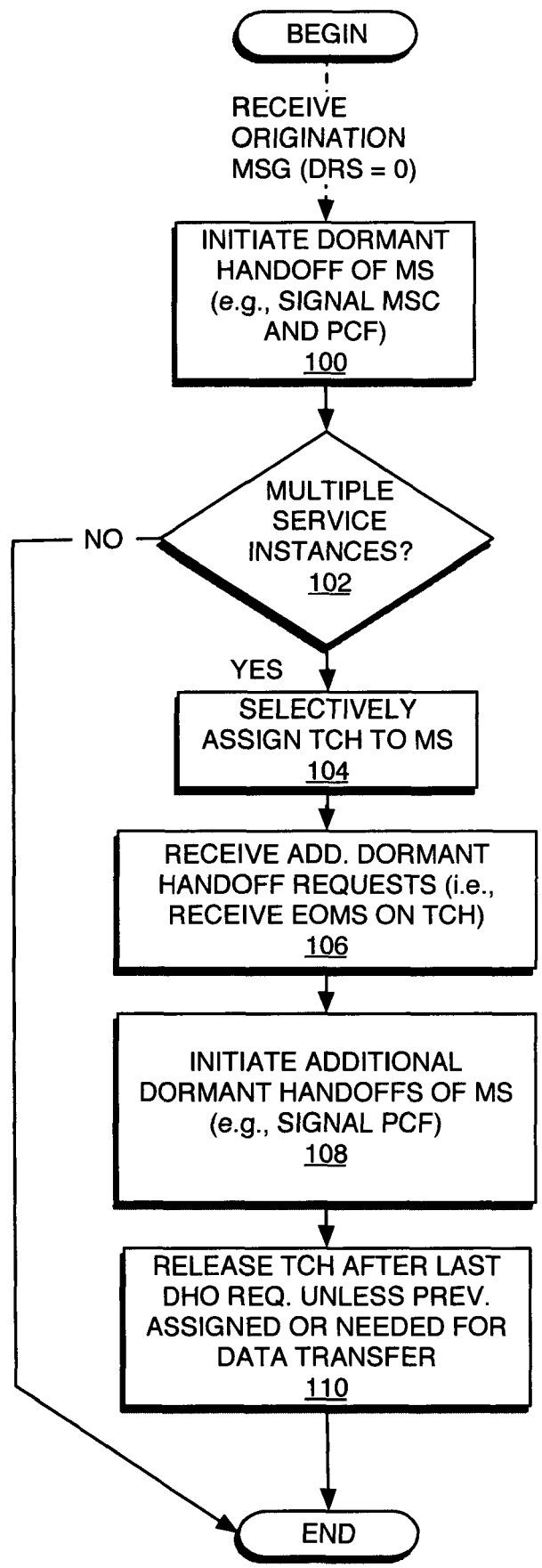
FIG. 2 is a diagram of exemplary processing logic to implement improved management of dormant handoff of mobile stations having multiple packet data service instances.

In this context, FIG. 2 illustrates exemplary processing logic that provides a broad presentation of dormant handoff processing logic according to the present invention. In a first scenario, mobile station 40 undergoes a packet data mobility event while it is dormant with respect to the packet data side of network 10 and is idle with respect to the voice side of network 10, i.e., it has no traffic channel assigned to it. With no dedicated traffic channel allocated to it, mobile station 40 sends a first dormant handoff request to network 10 over a common access channel. This first request corresponds to a first packet data service associated with the mobile station 40 and processing begins with the receiving BSC 20 initiating dormant handoff (re-registration) of that packet data service instance responsive to receiving the dormant handoff request (Step 100).

If the mobile station 40 has multiple service instances (102), BSC 20 may assign a traffic channel to it (Step 104) so that any remaining dormant handoff requests sent by the mobile station for the same mobility event are sent over the mobile station's assigned traffic channel rather than over the common access channel (Step 106). Then, BSC 20 initiates dormant handoff for each additional handoff request received from the mobile station 40 via the newly assigned traffic channel, thereby reducing the messaging burden on the common access channel(s) (Step 108). Note that BSC/MSC signaling is saved because the BSC 20 does not signal the MSC 36 for additional dormant handoff requests received as EOMs on the allocated traffic channel as opposed to dormant handoff requests received as Origination messages on the common access channel, each of which does trigger BSC/MSC signaling. In any case, once the last dormant handoff is performed, the BSC 20 releases the traffic channel and associated resources unless there was or is data to transfer for one or more of the service instances (Step 110).

Thus, according to an exemplary embodiment of the present invention, when a mobile station 40 with multiple dormant service instances sends an Origination Message to initiate dormant handoff of the first service instance, registration occurs with the PDSN 32 using existing cdma2000 procedures. Thus, if the PDSN 32 has valid PPP protocol state information for the mobile station 40 and it has no data to send to mobile station 40, the PDSN 32 checks state information to determine whether the mobile station 40 has multiple service instances. If so, PDSN 32 returns an indication of the number of service instances in the A11-Registration Reply message sent to the PCF 28. For example, the PDSN 32 may construct the A11-Registration Reply message such that it includes a MSI count, e.g., a Normal/Vendor-Specific Extension (NVSE) with a count of the number of service instances. In response, if the PCF 28 has not already established an A8 connection with the mobile station 40, it sets up an A8 connection and sends the MSI count to the BS in the corresponding A9-Connect-A8 message. If the PCF 28 has already setup an A8 connection for the mobile station 40 then the PCF 28 ignores the receipt of the NVSE in the A11-Registration Reply message returned from PDSN 32.

Upon receipt of the corresponding A9-Connect-A8 message, the BS (BSC 20) can then determine whether to setup a traffic channel for the mobile station 40 to improve the efficiency of dormant handoff of the mobile station's remaining service instances based on, for example, the indicated number of service instances, traffic loading, and resource availability. If a traffic channel is established, then the BS can use the service instance count information to determine when all the service instances have performed a dormant handoff and release the radio resources and clear the A8 connection. Additionally since the purpose of the radio resource allocation is to optimize network performance (reduce Access Channel and MSC-BS interface load) it is unreasonable to charge the subscriber for the use of this radio resource. Hence, the PCF 28 may choose to suppress accounting records sent to the PDSN 32 (to avoid charging the subscriber) when radio resources are allocated by the BSC to improve dormant handoff. In particular, the PCF 28, upon receipt of the A9-Update-A8 message resulting from the traffic channel assignment, does not send the Active Start Airlink record to the PDSN 32 unless user data transfer is detected to or from the mobile station 40 on the A8/A10 connection.

Figure 3B:
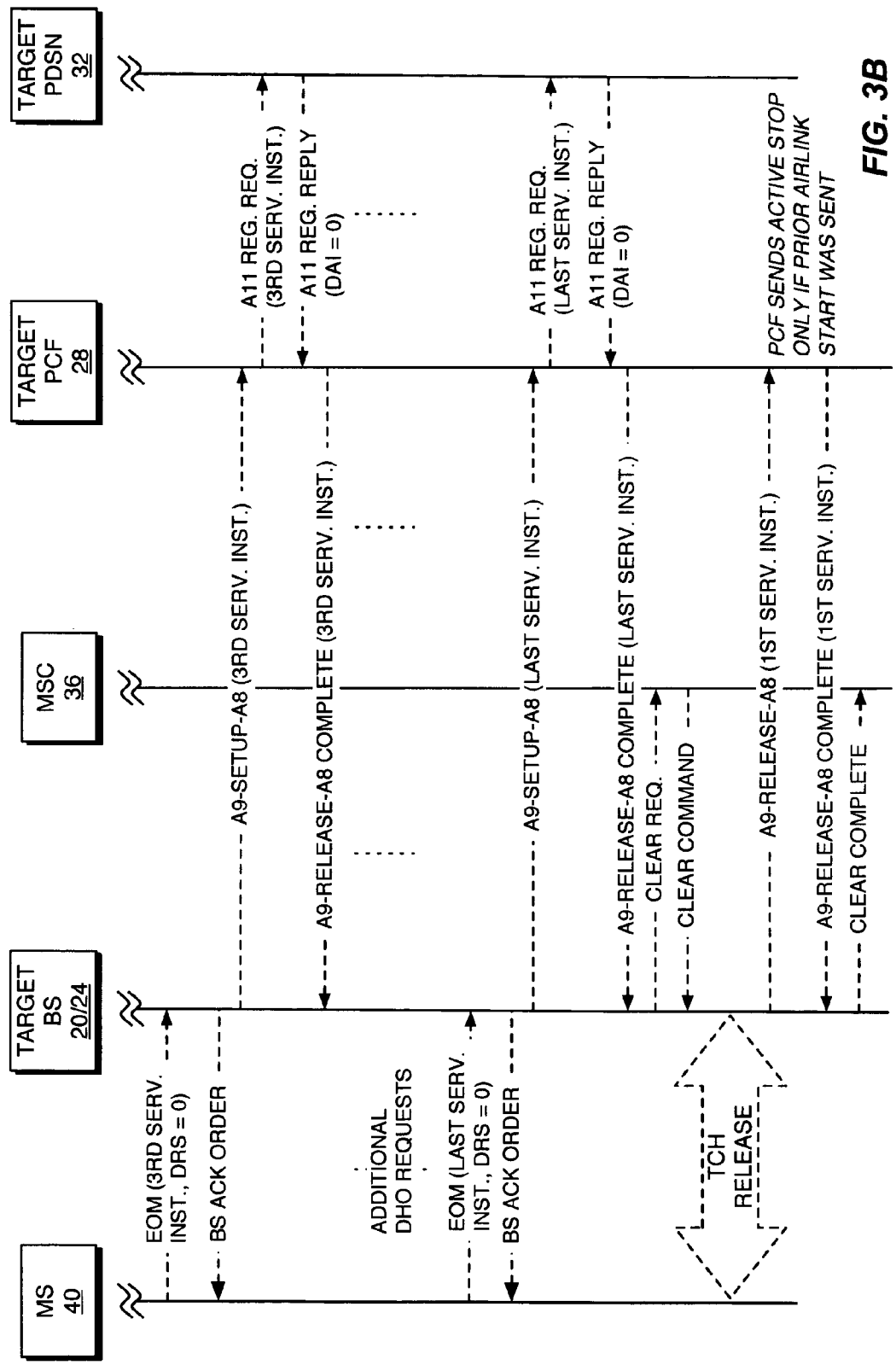

FIGS. 3A and 3B provide detailed treatment of the method described above. In particular, FIGS. 3A and 3B illustrate inter-entity signaling in a cdma2000 embodiment of network 10 according to an exemplary embodiment of the present invention. Processing begins with mobile station 40 crossing a packet zone boundary while in a dormant state, e.g., moving from Packet Zone x to Packet Zone y, and recognizing the need for re-registering its multiple packet data service instances. Where each PCF 28 is associated with a corresponding BSC 20, crossing a packet zone boundary means moving from the packet zone of a first (source) BSC/PCF into the packet zone of a second (target) BSC/PCF.

Thus, mobile station 40, which is associated with multiple dormant packet data service instances, detects a change of PZID, SID or NID while monitoring one or more broadcast channels and initiates an Origination message for a first one of its service instances with the Data Ready to Send (DRS) bit set to '0' to indicate that it has no data to send. The Origination message is sent over a common access channel and, in response to receiving the Origination message, the target BSC 20 acknowledges it by sending a Base Station Acknowledgment Order to the mobile station 40. Further, the target BSC 20 sends a CM Service Request message to a supporting MSC 36 receives an Assignment Request message from it in return. Such signaling is supported by the A1 BSC/MSC interface.

The target BSC 20 also initiates re-registration of the mobile station's first packet data service instance by sending an A9-Setup-A8 message to the BSC's associated PCF 28 (target PCF), which may be integrated with the BSC 20. In turn, the PCF 28 attempts to re-register the mobile station's first packet data service instance with a supporting PDSN 32 by sending an A11-Registration Request message to it.

In the illustrated call flow, PDSN 32 determines that it has no data for the mobile station 40 but that the mobile station 40 has multiple packet data service instances. PDSN 32 thus returns an A11-Registration Reply message to the PCF 28 that has the Data Available Indicator (DAI) set equal to zero (no data to send) but that includes information about the mobile station's multiple service instances, e.g., a MSI count. Further, the PDSN 32 disconnects the old A10 link from the source PCF (i.e., the prior PCF).

Since the registration reply message returned by PDSN 32 indicates that mobile station 40 has multiple packet data service instances, the PCF 28 establishes an A8 connection and transmits an A9-Connect-A8 Message with an indication of multiple service instances. The PCF 28 also includes the number of service instances as part of the message it sends to the BSC 20.

Then, responsive to recognizing that the mobile station 40 has multiple service instances associated with it, BSC 20 determines whether to allocate a traffic channel to the mobile station 40 to improve the efficiency of dormant handoff based on the number of service instances of the mobile and other information (e.g., loading, resource availability, etc.). If BSC 20 decides to assign a traffic channel to the mobile station 40 to improve dormant handoff efficiency, as shown, it sends an Assignment Complete to the MSC 36 indicating that assignment. As explained, assigning the traffic channel causes the mobile station 40 to send any additional dormant handoff requests as EOMs on the newly assigned channel. Note, too, that BSC 20 follows its conventional signaling protocol by providing an indication of the traffic channel assignment to PCF 28 by sending it an A9-Update-A8 message. If the BSC 20 chose not to establish a traffic channel, the A8 connection would be released and the next dormant handoff request(s) from mobile station 40 would arrive as an Origination message(s) and would be processed conventionally.

Thus, in response to establishing the air link (TCH) with mobile station 40, BSC 20 sends an A9-Update-A8 message to the PCF 28 to pass Accounting Parameters. Note that this passing of accounting parameters permits the network 10 to assess airtime usage against the mobile terminal subscriber whenever a traffic channel is established for the mobile terminal to support packet data service. However, here, the traffic channel was allocated to improve the efficiency of dormant handoff rather than to carry packet data to or from the mobile terminal 40. Thus, since the traffic channel is setup to optimize use of radio resources rather than to benefit the subscriber, the PCF 28 suppresses the A10/A11 Accounting Procedure (to avoid charging the subscriber) unless the PCF 28 detects user data transfer over the A8/A10 connection. However, upon receipt of the A9-Update-A8 message, PCF 28 responds with an A9-Update-A8 Ack message as it normally would. Thus, despite suppression of the accounting information, the PCF 28 provides BSC 20 with the expected acknowledgement message.

The remaining dormant service instances of the mobile station are handed-off over the traffic channel. That is, with a traffic channel now assigned to it, the mobile station 40 sends any additional dormant handoff requests for its remaining packet data service instances as EOMs over the newly allocated traffic channel. FIGS. 3A and 3B illustrate subsequent dormant handoffs based on receiving EOMs from the mobile station 40 for its second, third, etc., remaining service instances.

When all the service instances of the mobile station 40 have been handed off, or due to some other trigger, the BSC 20 initiates release of the first packet data service instance it handed off to dormancy. To do this, the BSC 20 sends a Clear Request message to the MSC 36. The MSC 36 returns a Clear Command message to the BSC 20 instructing it to release the associated dedicated resources. In response, the BS initiates traffic channel release and sends an A9-Release-A8 message to the PCF 28 to cause the PCF 28 to release the A8 connection for the first service instance it handed off. In turn, the PCF 28 acknowledges the A9-Release-A8 message by returning an A9-Release-A8 Complete message to BSC 20. The BSC 20 then returns a Clear Complete message to the MSC 36 and the MSC 36 releases the underlying transport connection. Note that the Clear Complete may occur anytime after the traffic channel is released.

It should be understood that in the above processing if either the mobile station 40 or the PDSN 32 had data to send, the BSC 20, the PCF 28, and the PDSN 32 all would cooperate according to standard methods to deliver any such data. The allocated traffic channel could be retained as needed to carry such data, and the PCF 28 would send the appropriate air link accounting information to the PDSN 32 since the traffic channel would then be carrying actual traffic for mobile station 40.

In some embodiments, BSC 20 can be configured to assign a traffic channel on a selective basis, such as where the service instance count is two or greater, or greater than some other service instance count threshold. Expanding on that theme, BSC 20 can be configured to perform a dynamic evaluation of whether to allocate a traffic channel in support of dormant handoff by, for example, evaluating its current loading or by otherwise evaluating its current state of resource availability. If resources are relatively free such that allocation of a traffic channel can be readily made, then BSC 20 might choose to make such allocation anytime a mobile station 40 undergoes dormant handoff with more than two service instances. In other cases, such as where resources are more scarce, BSC 20 may not make such an allocation unless more service instances are involved, or may skip improved dormant handoff operations altogether.

The present invention can be varied from the above exemplary description. For example, PCF 28 can be configured to determine that the mobile station 40 is associated with multiple packet data service instances. In such configurations, PDSN 32 would not necessarily be configured to return a multiple services indicator in the A11-Registration Reply messages, but PCF 28 would be configured to provide a similar multiple services indicator to BSC 20 under at least some circumstances. In these configurations, then, the BSC 20 recognizes the presence of multiple service instances based on an indicator generated by the PCF 28 the same as it would had the MSI count been generated by the PDSN 32.

For example, PCF 28 is aware of the Multiple Service Instance (MSI) count for a particular mobile station 40 under certain circumstances, such as where a mobile station 40 with multiple service instances does an inter-BS hard handoff (HHO) where the target BS is attached to a different PCF than the source BS (i.e., inter-BSS, inter-PCF HHO). Note that HHO is performed where the mobile station 40 has a traffic channel allocated to it at the point in time where it transitions from one packet zone to another.

In this case the target PCF 28 has to set up A10 connections with the target PDSN 32 for all of the packet data service instances associated with the mobile station 40, including all active and dormant service instances, as part of the existing procedures for the HHO. Note that since the mobile station 40 does not monitor overhead channels while it is on a traffic channel, it does not read the overhead channel being broadcast in the new packet zone and thus does not update its stored PZID. Thus, although mobile station 40 undergoes HHO from one packet zone to another, it does not logically "recognize" such change until it goes dormant and begins monitoring the overhead channel in the new packet zone.

When mobile station 40 does recognize the changed packet zone, it will perform a dormant handoff even though it is already in the new packet zone as a result of the earlier HHO. That is, once the mobile station 40 goes dormant and begins monitoring the overhead channel(s) in the new packet zone, it will recognize that the PZID being broadcast does not match its stored PZID, which was acquired the last time it was dormant, and thus will initiate a dormant handoff for each of its service instances.

In this case, when the first A9-Setup-A8 message reaches the PCF 28 that earlier received the mobile station 40 in HHO, it realizes that this mobile station 40 has multiple service instances based on its earlier operations in setting up the A10 connections for each of the mobile station's multiple service instance as part of the HHO processing. Thus, PCF 28 can use that information to determine that the mobile station 40 has multiple service instances associated with it, without benefit of receiving a MSI count from PDSN 32. PCF 28 can thus provide a MSI count to the BSC 20 and BSC 20 can process that count according to the methods described earlier herein.

In another embodiment, the BSC 20 can take advantage of HHO information such that it does not need PCF or PDSN generated MSI count information. For example, BSC 20 can be configured to recognize that a mobile station 40 is associated with multiple service instances based on prior information obtained for HHO of that mobile station 40. In other words, during HHO of a given mobile station 40, a target BSC 20 is made aware of the number of the number of active/dormant service instances associated with that mobile station 40. Such information may be provided to a target BSC 20 in a HHO of a mobile station 40 by a source BSC 20, which provides the target BSC 20 with a list of all active and dormant service instances associated with the mobile station 40 being handed off. Such information informs the target BSC 20 of the number of A10 data connections that the target PCF 28 will setup for the mobile station 40.

BSC 20 could retain such information at least temporarily for each mobile station 40 that it receives in HHO. Then, if the BSC 20 receives a dormant handoff request from a particular mobile station 40 a short while later, it can use that stored information to determine (or at least infer) the number of service instances associated with that mobile station 40. Thus, the BSC 20 receives a mobile station 40 in HHO and, as part of processing HHO for that mobile station 40, it determines that mobile station 40 is associated with multiple packet data service instances (which may be a mix of active and dormant service instances).

Then, if that BSC 20 receives a subsequent dormant handoff request from that mobile terminal 40 within a certain period—BSC 20 can run a post HHO timer for the mobile terminal 40, which can be started upon release of the mobile station's traffic channel—it can assume that the number of dormant service instances associated with the mobile terminal 40 is equal to the earlier number of (dormant and active) service instances associated with the mobile station 40 when BSC 20 received it in HHO. Thus, BSC 20 can make a determination about whether to allocate a traffic channel to the mobile station 40 to improve the efficiency of its dormant handoff without benefit of receiving any service instance count information from the PCF 28 or from PDSN 32.

Thus, those skilled in the art should recognize that the particular implementation details, while illustrating exemplary network operations, are not limiting with respect to practicing the present invention. Broadly, the present invention provides improved dormant mobile station handoff by selectively assigning traffic channels to mobile stations undergoing dormant handoff so that those mobile stations make use of their newly assigned traffic channels to send dormant handoff requests. Further, the present invention provides reduced BSC/MSC signaling even where dormant mobile stations already have a traffic channel assigned to them for voice or other circuit-switched services. Thus, the present invention is not limited by the foregoing description, but rather is limited only the by following claims and their reasonable equivalents.

What is claimed is:

1. A method of managing dormant handoffs of mobile stations at a wireless communication network Base Station (BS), the method comprising:
    initiating dormant handoff of a mobile station that is undergoing a packet data mobility event responsive to receiving a first dormant handoff request from the mobile station for a first packet data service instance of the mobile station; and
    recognizing that the mobile station has additional packet data service instances requiring dormant handoff and, responsive to said recognizing, selectively assigning a traffic channel to the mobile station to cause the mobile station to send additional dormant handoff requests for the additional packet data service instances over the assigned traffic channel.

2. The method of claim 1, wherein recognizing that the mobile station has additional packet data service instances requiring dormant handoff comprises receiving a multiple service instance indicator in a message returned by a Packet Control Function (PCF) in response to the BS initiating dormant handoff of the mobile station.

3. The method of claim 1, wherein selectively assigning a traffic channel to the mobile station comprises assigning the traffic channel if a total number of multiple service instances for the mobile station exceeds a threshold.

4. The method of claim 1, wherein selectively assigning a traffic channel to the mobile station comprises assigning the traffic channel if the mobile station has two or more packet data service instances.

5. The method of claim 1, wherein selectively assigning a traffic channel to the mobile station comprises selectively assigning or not assigning a traffic channel to the mobile station based on resource availability at the BS.

6. The method of claim 5, wherein selectively assigning a traffic channel to the mobile station comprises selectively assigning or not assigning a traffic channel to the mobile station further based how many additional packet data service instances the mobile station has.

7. The method of claim 1, further comprising counting subsequent dormant handoff requests sent by the mobile station over the assigned traffic channel and releasing the traffic channel once the count equals the number of additional packet data service instances.

8. The method of claim 1, wherein receiving a first dormant handoff request from the mobile station for a first packet data service instance of the mobile station comprises receiving an Origination message from the mobile station over a common access channel of the BS.

9. The method of claim 8, further comprising receiving the additional dormant handoff requests as Enhanced Origination messages from the mobile station over the assigned traffic channel.

10. The method of claim 8, further comprising determining that the Origination message is a dormant handoff request by inspecting a data ready/not ready indicator in the Origination message.

11. The method of claim 1, further comprising initiating dormant handoff of each additional packet data service instance responsive to receiving each additional dormant handoff request.

12. The method of claim 11, wherein receiving each additional dormant handoff request comprises receiving an Enhanced Origination message for each additional dormant handoff request over the assigned traffic channel.

13. The method of claim 1, wherein recognizing that the mobile station has additional packet data service instances requiring dormant handoff and selectively assigning a traffic channel to the mobile station comprises retaining information obtained during a prior hard handoff of the mobile station regarding a number of packet data service instances associated with the mobile station.

14. The method of claim 13, wherein retaining information obtained during a prior hard handoff of the mobile station regarding a number of packet data service instances associated with the mobile station comprises retaining a service instance count based on the number of A10 data connections handed off for the mobile station.

15. The method of claim 14, further comprising running a timer upon releasing a traffic channel associated with the prior hard handoff of the mobile station and using the retained service instance count as the number of packet data service instances associated with the mobile station if a dormant hard handoff request is received from the mobile station before expiration of the timer.

16. The method of claim 13, wherein retaining information obtained during a prior hard handoff of the mobile station regarding a number of packet data service instances associated with the mobile station comprises retaining service instance information received from a source BS during the prior hard handoff of the mobile station.

17. A method of managing dormant handoffs of mobile stations at a wireless communication network Packet Control Function (PCF), the method comprising:
    at the PCF, recognizing that a mobile station undergoing dormant handoff has multiple packet data service instances; and at the PCF, sending an indication of the multiple packet data service instances to a Base Station (BS) supporting the dormant handoff of the mobile station.

18. The method of claim 17, wherein the BS assigns a traffic channel to the mobile station responsive to receiving the indication from the PCF, and further comprising suppressing a subscriber accounting message that is normally sent by the PCF to a Packet Data Serving Node (PDSN) as part of assigning traffic channels to mobile stations.

19. The method of claim 18, further comprising sending a subscriber accounting message responsive to detecting data transfer to or from the mobile station for any packet data service instance.

20. The method of claim 17, wherein recognizing that a mobile station undergoing dormant handoff has multiple packet data service instances comprises recognizing an indication of multiple packet data service instances in a registration reply message returned by a Packet Data Serving Node (PDSN) as part of re-registering a first one of the multiple packet data service instances.

21. The method of claim 20, wherein sending an indication of the multiple packet data service instances to a Base Station (BS) supporting the dormant handoff of the mobile station comprises passing the indication of the multiple packet data service instances received from the PDSN along to the BS unless the PCF has already set up an A8 connection for the mobile station.

22. The method of claim 17, wherein sending an indication of the multiple packet data service instances to a Base Station (BS) supporting the dormant handoff of the mobile station comprises sending a multiple service instance count to the BS.

23. The method of claim 17, wherein recognizing that a mobile station undergoing dormant handoff has multiple packet data service instances comprises using information obtained during a prior hard handoff of the mobile station regarding a number of packet data service instances associated with the mobile station.

24. The method of claim 23, wherein using information obtained during a prior hard handoff of the mobile station regarding a number of packet data service instances associated with the mobile station comprises using a service instance count based on the number of A10 data connections handed off for the mobile station.

25. A method of managing dormant handoffs of mobile stations at a wireless communication network Packet Data Serving Node (PDSN), the method comprising:
at the PDSN, receiving a registration request message for a first packet data service instance associated with a mobile station undergoing a dormant handoff;
at the PDSN, determining that more than one packet data service instance is associated with the mobile station; and
at the PDSN, sending an indication of multiple packet data service instances in a registration reply message responsive to the registration request message.

26. The method of claim 25, wherein the indication of multiple packet data service instances comprises a service instance count value included in the registration reply message, and wherein the service instance count value depends on a number of packet data service instances associated with the mobile station.

27. The method of claim 25, wherein sending an indication of multiple packet data service instances in a registration reply message responsive to the registration request message comprises including a multiple service instance count in the registration reply message.

28. The method of claim 25, further comprising suppressing the indication of multiple packet data service instances in subsequent registration reply messages corresponding to additional registration request messages received for any additional packet data service instances associated with the mobile station.

29. A method of improving dormant handoff of mobile stations in CDMA2000 wireless communication networks, the method comprising:
receiving a dormant handoff request from a mobile station for a first packet data service instance via a common access channel shared with other mobile stations;
determining whether the mobile station is associated with multiple packet data service instances; and
if the mobile station is associated with multiple packet data service instances, assigning a traffic channel to the mobile station to cause the mobile station to send additional dormant handoff requests for any additional packet data service instances via signaling on the assigned traffic channel.

30. A Base Station Controller (BSC) for use in a wireless communication network, the BSC comprising:
a first interface to communicate with one or more Radio Base Stations (RBSs) that support wireless communication with a plurality of mobile stations;
a second interface circuit to communicate with a Packet Control Function (PCF) that provides a Radio-Packet (RP) interface between the BSC and a Packet Switched Core Network (PSCN); and
a control circuit to control dormant handoff of mobile stations, wherein the control circuit is configured to:
initiate dormant handoff of a mobile station that is undergoing a packet data mobility event responsive to receiving a first dormant handoff request from the mobile station for a first packet data service instance of the mobile station; and
recognize that the mobile station has additional packet data service instances requiring dormant handoff and, responsive to that recognition, selectively assign a traffic channel to the mobile station to cause the mobile station to send additional dormant handoff requests for the additional packet data service instances over the assigned traffic channel.

31. The BSC of claim 30, wherein the control circuit recognizes that the mobile station has additional packet data service instances requiring dormant handoff based on receiving a multiple service instance indicator in a message returned by the PCF in response to the BSC initiating dormant handoff of the mobile station.

32. The BSC of claim 30, wherein the control circuit selectively assigns a traffic channel to the mobile station based on determining whether a count of the packet data service instances exceeds a threshold.

33. The BSC of claim 30, wherein the control circuit selectively assigns a traffic channel to the mobile station based on assigning the traffic channel if the mobile station has two or more packet data service instances.

34. The BSC of claim 30, wherein the control circuit is configured to count subsequent dormant handoff requests sent by the mobile station over the assigned traffic channel and release the traffic channel once the count equals the number of additional packet data service instances.

35. The BSC of claim 30, wherein the control circuit receives a first dormant handoff request from the mobile station for a first packet data service instance of the mobile station based on the first interface receiving an Origination message sent from the mobile station over a common access channel supported by the BSC.

36. The BSC of claim 35, wherein the control circuit receives the additional dormant handoff requests based on the first interface receiving Enhanced Origination messages sent from the mobile station over the assigned traffic channel.

37. The BSC of claim 35, wherein the control circuit is configured to determine that the Origination message is a dormant handoff request by inspecting a data ready/not ready indicator in the Origination message.

38. The BSC of claim 30, wherein the control circuit is configured to initiate dormant handoff of each additional packet data service instance responsive to receiving each additional dormant handoff request from the mobile station.

39. The BSC of claim 38, wherein the control circuit receives each additional dormant handoff request comprises receiving an Enhanced Origination message sent by the mobile station over the assigned traffic channel for each additional packet data service instance.

40. The BSC of claim 30, wherein the control circuit is configured to recognize that the mobile station has additional packet data service instances requiring dormant handoff by retaining information obtained during a prior hard handoff of the mobile station regarding a number of packet data service instances associated with the mobile station.

41. The BSC of claim 40, wherein the control circuit is configured to retain information obtained during a prior hard handoff of the mobile station regarding a number of packet data service instances associated with the mobile station by retaining a service instance count based on the number of A10 data connections handed off for the mobile station.

42. The BSC of claim 41, wherein the control circuit is configured to run a timer after releasing a traffic channel associated with the prior hard handoff of the mobile station and use the retained service instance count as the number of packet data service instances associated with the mobile station if a dormant hard handoff request is received from the mobile station before expiration of the timer.

43. The BSC of claim 30, wherein the control circuit is configured to selectively assign a traffic channel to the mobile station to cause the mobile station to send additional dormant handoff requests for the additional packet data service instances over the assigned traffic channel based on resource availability at the BSC.

* * * * *